H. SAUL & R. N. EVANS.
CIGAR CUTTER AND CLEANER.
APPLICATION FILED OCT. 8, 1908.
920,395.
Patented May 4, 1909.
2 SHEETS—SHEET 1.
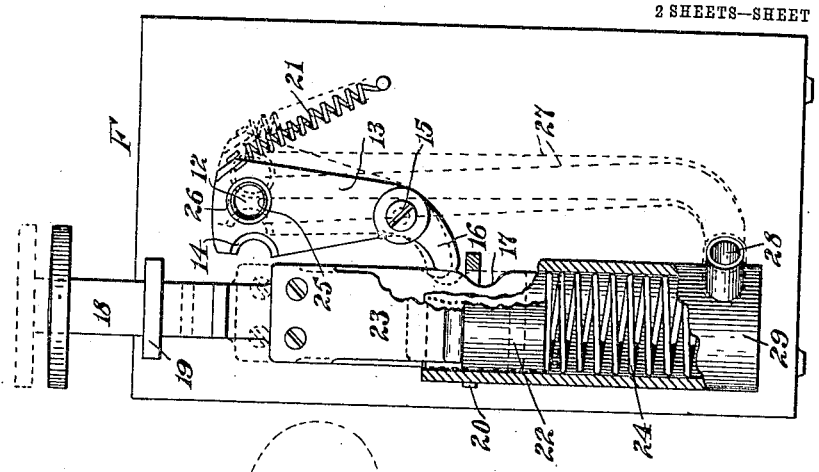
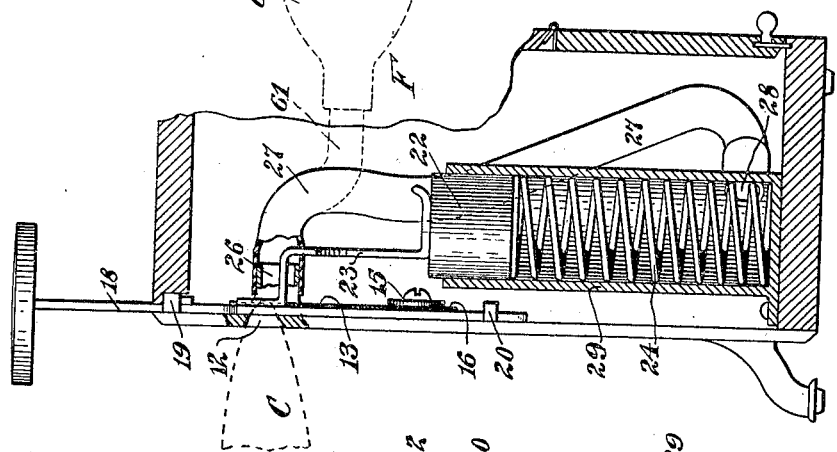
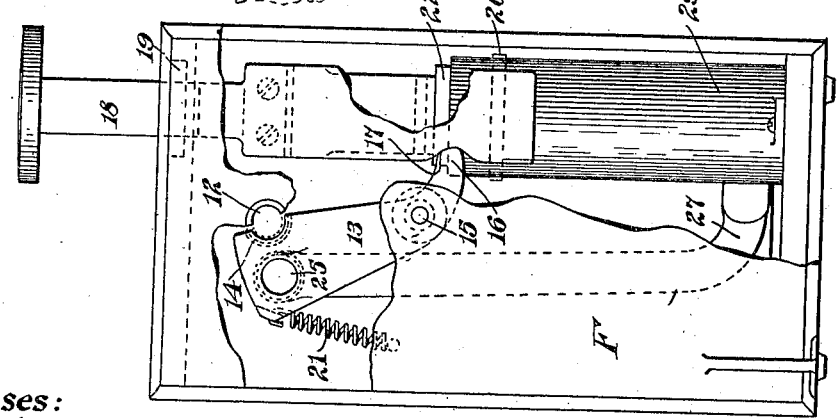
Witnesses:
C. G. Fuss.
H. D. Penney
Inventors:
Henry Saul,
Robert N. Evans,
By their Attorney,
F. A. Richards.

H. SAUL & R. N. EVANS.
CIGAR CUTTER AND CLEANER.
APPLICATION FILED OCT. 8, 1908.
920,395.
Patented May 4, 1909.
2 SHEETS—SHEET 2.
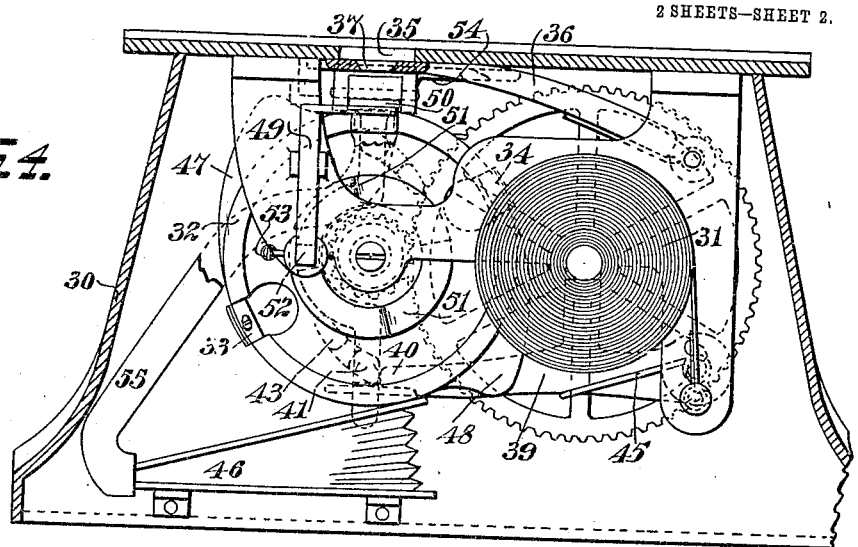
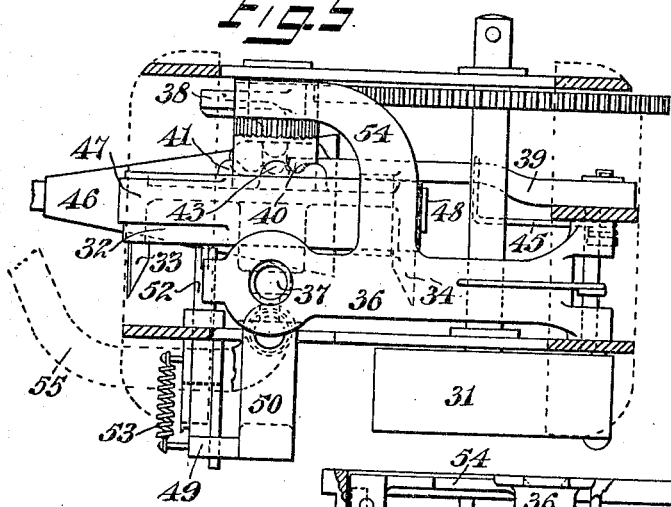
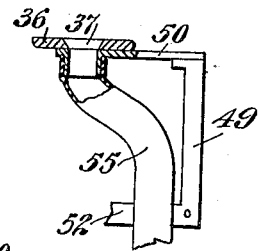
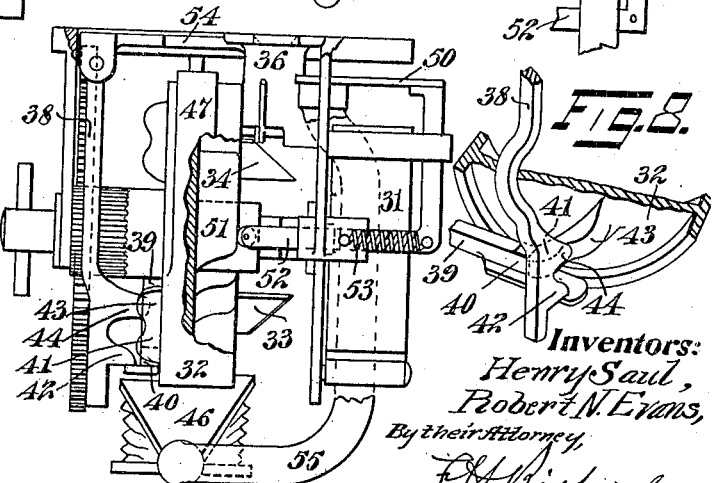
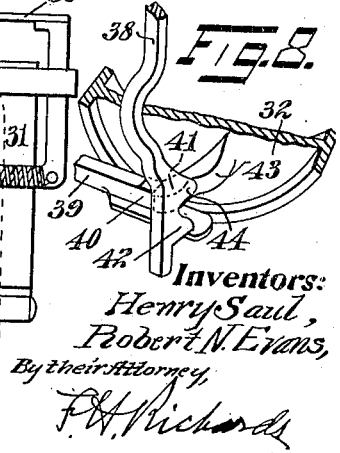
Witnesses:
Inventors:
Henry Saul,
Robert N. Evans,
By their Attorney,

UNITED STATES PATENT OFFICE.

HENRY SAUL, OF NORTH BEACH, AND ROBERT N. EVANS, OF BROOKLYN, NEW YORK.

CIGAR CUTTER AND CLEANER.

No. 920,395.   Specification of Letters Patent.   Patented May 4, 1909.

Application filed October 8, 1908. Serial No. 456,705.

*To all whom it may concern:*

Be it known that we, HENRY SAUL, a citizen of the United States, residing at North Beach, in the county of Queens and State of New York, and ROBERT N. EVANS, a citizen of the United States, residing at Brooklyn, in the county of Kings and State of New York, have invented certain new and useful Improvements in Cigar Cutters and Cleaners, of which the following is a specification.

This invention relates to a device for automatically cutting off the tip of a cigar and at the same time blows through the cigar to remove the dust and dirt.

The object of the invention is to provide a device that will sever the tip of a cigar, and that immediately thereafter will cause a blast of air to be delivered into the cut cigar that will pass through the cigar and remove any dust or dirt that may be contained therein; which mechanism is controlled by, or directly operative from a single actuating member, such as frequently used in cigar tip cutting devices, which member in some instances itself severs the cigar tip, while in other devices the movable member releases the mechanism in which power is stored, and causes the actuation of a cutting member.

In the accompanying drawings representing embodiments of our invention, Figure 1 is a side elevation, certain parts being broken away. Fig. 2 is a side elevation certain parts being shown in section. Fig. 3 is a side elevation from the side opposite to that shown in Fig. 1, certain parts being shown in section and broken away. Figs. 4-8 show the modification.

In the construction shown in Figs. 1, 2 and 3, in a suitable frame member F is a circular aperture 12 preferably formed conical and of a size to receive the tip end of a cigar for a sufficient distance to permit the length desired to be cut off, to project through the opening. A movable cutter member is provided that will pass across this opening, and coöperate with one side thereof to sever the cigar tip projecting therethrough. In these figures, the movable cutter member comprises a blade 13 having a curved recess 14 along one side, that is preferably inclined or conical shape at the edge to form a cutting member. This blade is movably supported to shift past the opening, being preferably pivoted on a pin or screw 15, to swing thereon and cause its cutter portion to register with and move across the stationary cutter portion 12. The blade 13 has an arm 16 that engages a cam face 17 on a plunger 18 that is guided in brackets 19 and 20 on the frame for reciprocation. When the plunger is depressed from its normal position shown in Fig. 1, the cam face will engage the arm and swing the blade 13 causing it to move across the cutter opening 12 and sever the tip of a cigar inserted in the opening. Suitable means are provided for returning the cutter to normal position such as a coil spring 24, that will press the arm 16 into engagement with the plunger member; but the blade is prevented from returning as long as the plunger is depressed, as indicated in Fig. 3; but upon return of the plunger to normal position, the arm will be forced into the recess at the cam portion and return to normal position, permitting the insertion of another cigar end. Means are provided for furnishing a blast of air, in the form of a fluid pressure device. In these figures, the latter comprises a cylinder 29 in which slides a piston 22, that is engaged by a bent arm 23 secured to the plunger 18. A coil spring 24 in the cylinder below the piston serves to return the piston after being advanced by the plunger, and will return the plunger to its normal position as shown in Fig. 2. Suitable means are provided for directing the air from the lower end of the cylinder onto the severed end of the cigar in the cutter opening 12 in the frame, after the tip has been severed. In the construction shown in these figures the blade 13 contains an aperture 25 that will register with the cutter opening 12 upon further advance of the blade after severing of the tip, as indicated in Fig. 3. A collar 26 projects from this opening in the blade, and a flexible conduit or tube 27 extends from the outlet 28 at the bottom of the piston, and connects to this collar 26. Preferably some slack is provided in this tube to permit the free swinging of the blade.

The operation of the device is as follows: The parts being in the position indicated in Figs. 1 and 2, a cigar C is inserted in the opening as indicated in broken lines in Fig. 2, with the end projecting through the opening 12. Upon forcing down the plunger 19 the cutter portion of the blade will at once engage the cigar tip and coöperating with the cutter opening 12 in the frame, will cut off the tip as the blade forces across the opening. The continued movement of the blade will bring the opening 25 to register with the cutter opening 12 in which position the end of the arm 16 will bear against the side edge of the plunger as indicated in Fig. 3. But the entire movement of the plunger will force the piston 22 downward and compress the air in the cylinder. As soon as the opening 25 is brought opposite the now severed cigar, the air in the cylinder will be directed against the cigar end just cut, and it will be forced through the cigar, that will drive out at the other end, any dust or fine particles contained in the cigar. Upon release of the plunger, the coil spring 24 in the cylinder will return the plunger to its normal position; and the spring 20 will draw the blade back to its normal position as soon as the cam opening in the plunger comes opposite the arm 16 of the blade.

In the arrangement shown in Figs. 4-8, our cigar cleaner attachment is applied to a construction where power is stored in a large spring and the application of the cigar will release a trip and permit the automatic operation of the cutter member to sever the tip without the power for operating the cutter being furnished by the person who is having the cigar cut. This mechanism comprises essentially a receptacle 30 in which is a coil spring 31 driving a wheel 32 carrying two cutters 33 and 34. Below an opening 35 in the top is a lever 36 having a cutter opening 37. The cigar is inserted and pressed to swing the lever downward. An extension 54 on the lever carries a swinging arm 38. A trip arm 39 has a lug 40 normally in position to engage one of a pair of cams 41 on the wheel. This trip arm 39 normally lies near a lug 42 on the swinging arm 38, and when the latter is moved downward by the cigar swinging lever 36, the trip arm 39 moves away from the cam 41 and permits rotation of the wheel; the spring having been previously wound up. This will cause one of the cutters 33 to shift past the projecting end of the cigar in the lever 36 that has been moved downward into the path of the cutter on the wheel and the tip is severed. But as soon as the wheel starts to move, a second cam 43 adjacent the cam 41 strikes a lug 44 on the swinging arm 38, and will shift the lug 42 away from engagement with the trip arm 39, thereby releasing the latter and the trip arm will be moved upward by a spring 45 to engage an oppositely arranged cam on the wheel and arrest the wheel after a half revolution. Thus each time a cigar is inserted and the lever 36 depressed one of the two cutters will shift past the opening in the lever and sever the tip. The construction just described forms no part of the present invention, but to cause a blast of air to be delivered on the cut end of the cigar, we provide a suitable pressure device such as a pair of bellows 46, that are operated by cams 47 and 48 fast on the drum, and positioned relatively to the two knives so that the bellows will be operated at each severing operation. A flexible tube 55 leads from the bellows to a swinging bracket 49 carrying a discharge plate 50. This bracket is shifted as soon as the tip is cut, by a cam 51 engaging an arm 52 on the bracket. A spring 53 returns the bracket to normal position. When the cigar is inserted and the lever 36 pressed downward the wheel is released and given a half revolution as just described. As soon as the cutter passes the lever, the discharge plate 50 is brought adjacent the lever opening, and at this time one of the cams 47 or 48 will cause a blast of air to be forced through the flexible tube and against the cut end of the cigar. This will serve to force out of the cigar any dust or small particles contained therein.

In Fig. 2 is shown a modification whereby the pressure device is not actuated by the plunger but separately. The tube 27 may be bent upward as at 61 and secured to a bulb 60. By pressing this bulb after the cigar is cut a blast of air will be directed onto the cigar.

Having thus described our invention, we claim:

1. The combination with a tip cutting device, of a fluid pressure device, means for directing air from the fluid pressure device at the cutting device, and means operatively connected with the cutting device for causing a blast of air to be delivered at the cutting member.

2. The combination with a cutting device for severing a cigar tip, of a fluid pressure device, means for directing air from the fluid pressure device at the cutting device, and means for causing the cutting device to operate the fluid pressure device to deliver a blast of air immediately after the severing of the cigar tip by the cutting device.

3. The combination of a cutting device for severing a cigar tip, a fluid pressure device, means operatively connecting the cutting device with the fluid pressure device, and a movable delivery member leading from the fluid pressure device and connected with the cutting device to direct a blast of air at the cutting position immediately after the cutting operation.

4. The combination of a frame having a cutter portion, a cutter movable relative to the said cutter portion to sever a cigar tip, a fluid pressure device operatively connected with the movable cutter member, a shiftable conduit leading from the pressure device and connected with the movable cutter member, whereby the conduit will discharge at the said cutter portion of the frame after the severing of the cigar tip by the cutter member.

5. The combination of a frame having a cutter opening therein, a blade pivoted on the frame and having a cutter portion at one edge arranged to register with the opening as the blade is swung to sever a cigar tip at the opening, a cylinder, a piston operating in the cylinder, a plunger arranged to operate the piston, the blade having an arm engaged by the piston to swing the blade, a conduit leading from the cylinder and having its other end connected with the blade member to be brought to register with the cutter opening in the frame upon advance of the cutter member.

6. The combination of a frame member having a cutter opening therein, a blade pivoted to the frame and having a cutter portion at one edge arranged to register with the cutter opening when the blade is swung, a pressure device, a plunger arranged to operate the pressure device, an arm on the blade arranged to engage the plunger to swing the blade, and a conduit leading from the pressure device and connected with the blade to be brought to register with the cutter opening in the frame after the tip has been severed.

7. The combination of a frame having a cutter opening therein, a blade pivoted on the frame and having a cutter portion at one edge arranged to register with the cutter opening when the blade is swung, a plunger having a cam portion, an arm on the blade arranged to engage the cam portion of the plunger to swing the blade past the cutter opening, a spring for returning the blade to normal position, a cylinder, a piston working in the cylinder and operated by the plunger member, the blade having an opening therein arranged to register with the said cutter opening after the tip is severed and a flexible pipe leading from the cylinder and connected with the opening in the blade, and a spring in the cylinder for returning the piston and plunger to normal position.

HENRY SAUL.
ROBERT N. EVANS.

Witnesses:
WM. H. REID,
HENRY E. GREENWOOD.